(12) United States Patent
Nancke-Krogh et al.

(10) Patent No.: US 9,785,338 B2
(45) Date of Patent: Oct. 10, 2017

(54) SYSTEM AND METHOD FOR PROVIDING A USER INTERACTION INTERFACE USING A MULTI-TOUCH GESTURE RECOGNITION ENGINE

(71) Applicant: MOSAIQQ, Inc., San Francisco, CA (US)

(72) Inventors: Anders Nancke-Krogh, San Francisco, CA (US); Nina Nancke-Krogh, San Francisco, CA (US)

( * ) Notice: Subject to any disclaimer, the term of this patent is extended or adjusted under 35 U.S.C. 154(b) by 274 days.

(21) Appl. No.: 13/926,717

(22) Filed: Jun. 25, 2013

(65) Prior Publication Data

US 2014/0002394 A1    Jan. 2, 2014

Related U.S. Application Data

(60) Provisional application No. 61/667,034, filed on Jul. 2, 2012, provisional application No. 61/791,022, filed on Mar. 15, 2013.

(51) Int. Cl.
*G06F 3/0488* (2013.01)

(52) U.S. Cl.
CPC ........ *G06F 3/0488* (2013.01); *G06F 3/04883* (2013.01); *G06F 2203/04808* (2013.01)

(58) Field of Classification Search
CPC ............................ G06F 3/0488; G06F 3/04883
USPC ....................................................... 345/173
See application file for complete search history.

(56) References Cited

U.S. PATENT DOCUMENTS

| | | | |
|---|---|---|---|
| 6,323,846 B1 * | 11/2001 | Westerman | G06F 3/0235 345/173 |
| 8,682,973 B2 | 3/2014 | Kikin-Gil | |
| 2002/0033839 A1 | 3/2002 | Elber | |
| 2005/0086612 A1 | 4/2005 | Gettman | |
| 2005/0132299 A1 | 6/2005 | Jones | |
| 2006/0125803 A1 * | 6/2006 | Westerman | G06F 3/04883 345/173 |
| 2007/0294632 A1 | 12/2007 | Toyama | |
| 2009/0096810 A1 | 4/2009 | Green | |
| 2011/0202834 A1 | 8/2011 | Mandryk | |
| 2014/0333674 A1 | 11/2014 | Lawson | |

FOREIGN PATENT DOCUMENTS

DE            101 38 337 A1    11/2002

* cited by examiner

*Primary Examiner* — Fred Tzeng
(74) *Attorney, Agent, or Firm* — Louis Wu

(57) ABSTRACT

Described herein are systems and methods for enabling a multi-touch gesture recognition engine, where gesture recognition can be made based on touch or motion detection. In accordance with an embodiment the system include a hardware input list delivered from the hardware sensor(s), a touchobject list delivered from the application(s)/OS and logic to calculate and determine gestures based on mapping touchpoints from the sensor(s) with touchobjects from the application(s) in a time perspective. The engine can use a generic state machine in each gestureobject to keep track of the status of the gestureobject independently. Additional embodiments are also described herein.

9 Claims, 10 Drawing Sheets

FIGURE 1

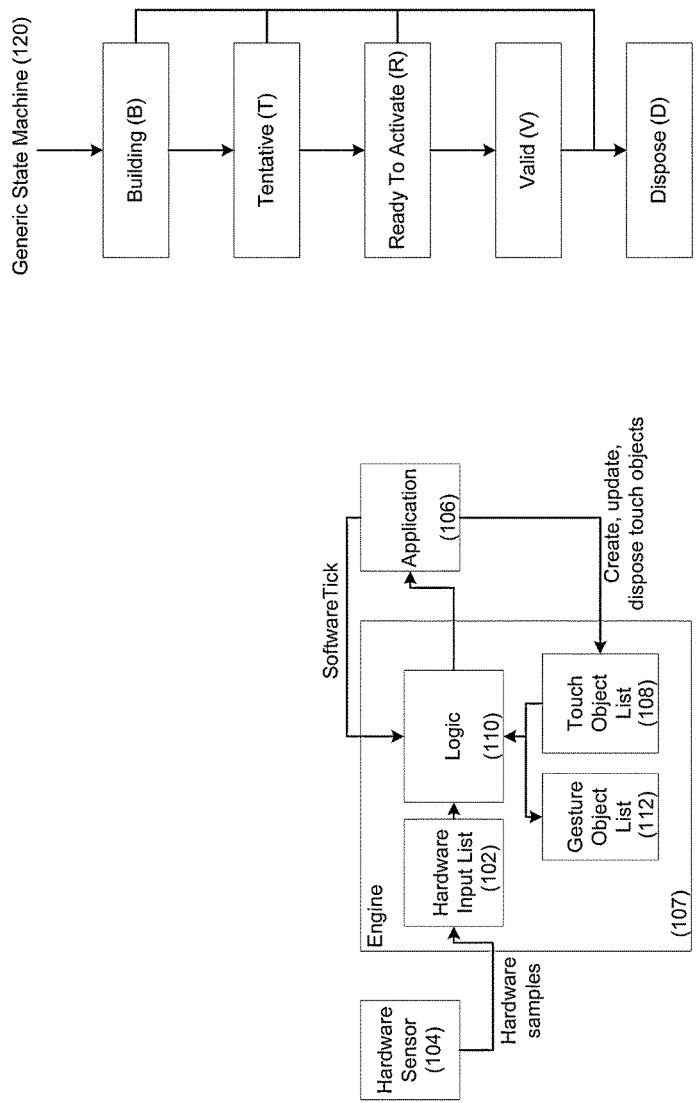

|  | GO_I | GO_II |
|---|---|---|
| Hardware sample 1 | B -> T | B -> T |
| Hardware sample 2 | T | T -> R |
| Hardware sample 3 | T -> R -> V | R -> D |

(150)

(130) Touch Object B with Gesture Object (GO_II)
(140) Touch Object A with Gesture Object (GO_I)

|  | GO_I | GO_II |
|---|---|---|
| Hardware sample 1 | B -> T | B -> T |
| Hardware sample 2 | T | T -> R |
| Hardware sample 3 | T -> D | R -> V |

(160)

| | GO_M2 | GO_C5 | finger id 0 | finger id 1 | finger id 2 | finger id 3 | finger id 4 |
|---|---|---|---|---|---|---|---|
| Hardware sample 1 | B | B | X | | | | |
| Hardware sample 2 | B -> T | B | X | | | | |
| Hardware sample 3 | T -> D | B | X | X | | | |
| Hardware sample 4 | | B -> T | X | X | X | | |
| Hardware sample 5 | | T | X | X | X | X | X |
| Hardware sample 6 | | T -> R -> V -> D | | | | X | X |
(320)
FIGURE 8
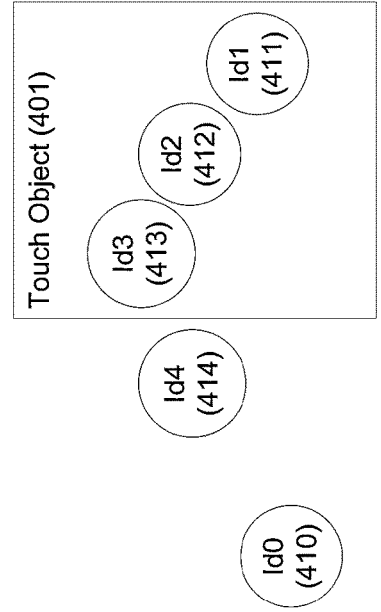
FIGURE 10
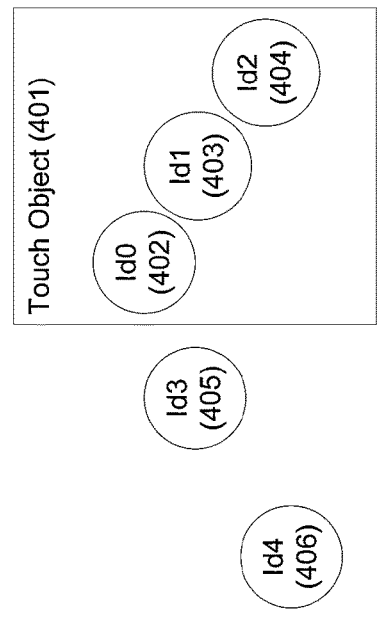
FIGURE 9

SYSTEM AND METHOD FOR PROVIDING A USER INTERACTION INTERFACE USING A MULTI-TOUCH GESTURE RECOGNITION ENGINE

CLAIM OF PRIORITY

This application claims the benefit of priority to U.S. Provisional Patent Application titled "SYSTEM AND METHOD FOR MULTI-TOUCH GESTURE RECOGNITION ENGINE", Application No. 61/667,034, filed Jul. 2, 2012; and U.S. Provisional Patent Application titled "SYSTEM AND METHOD FOR MULTI-TOUCH GESTURE RECOGNITION ENGINE", Application No. 61/791,022, filed Mar. 15, 2013; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems, and user-computer interaction, and are particularly related to systems and methods for enabling a multi-touch gesture recognition engine.

BACKGROUND

In today's computer environments, the user experience is dependant on the time it takes the computer to render feedback based on a user input. The user expects instant feedback based on the user's input. However what the user experiences as instant means the computer system will have several milliseconds (ms) to calculate and render feedback. This focus of delivering feedback within milliseconds is one of the key elements in developing such computer systems and methods.

SUMMARY

Described herein are systems and methods for enabling a multi-touch gesture recognition engine, where gesture recognition can be made based on touch or motion detection. In accordance with an embodiment, the system includes a computing device with a surface that reacts to touch or a motion, and a gesture recognition engine (engine). The engine includes, or can be associated with, a touch or a motion input from hardware sensor(s), application(s) input in terms of software tick (softwaretick) and touchobject information, a touchobject list, a hardware input list, a logic handler, and events as output to the application(s). The system collects touch or motion inputs from the hardware sensor(s) either directly from the sensor or through the operating system (OS) and stores the input in the hardware input list. The system also collects information from the application(s) for each touchobject and stores the input in a touchobject list, either directly from the application or through the OS. This means the engine receives touchobject inputs, when the application(s) creates a new touchobject, updates an already known touchobject (e.g., resize) and/or a touchobject is disposed. The system can receive a request from the application(s) in the form of a softwaretick either directly from the application(s) or through the OS. The engine runs its logic based on its current hardware input list and touchobject list. The output is returned as events to the application(s). The application(s) then uses the event(s) as input to its own logic, before the application renders the feedback. The softwaretick can either be pushed to the engine, or the engine can pull the application or OS for a softwaretick. The system can start its logic based on either a hardware triggered event or a softwaretick.

BRIEF DESCRIPTION OF THE FIGURES

FIG. 1 shows an illustration of a high-level view of the model with the components, in accordance with an embodiment.

FIG. 2 illustrates the generic state machine a gestureobject runs through, in accordance with an embodiment.

FIG. 8 is a continuation of FIG. 7 and illustrates in an embodiment how the touchpoints impacts the generic state machine inside each gestureobject.

FIG. 9 illustrates an embodiment of how grouping of touchpoints can allow a gestureobject to become valid even though not all touchpoints are within the touchobjects perimeter.

FIG. 10 is a continuation of FIG. 9 and illustrates how an embodiment of grouping of touchpoints can be handled over time.

DETAILED DESCRIPTION

Figures 3, 4, 5:
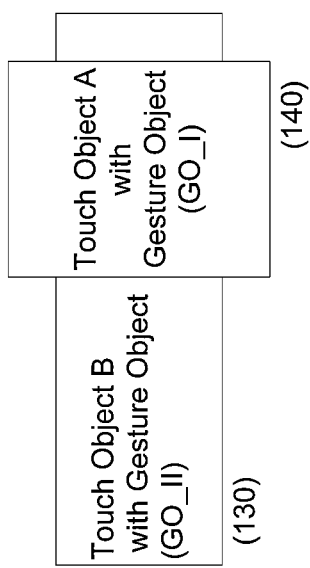
FIG. 3 illustrates an example of an embodiment of how the state machine can work, when two solid touchobjects are on top of each other and each has gestureobjects that share touchpoints.
FIG. 4 is a continuation of FIG. 3 and illustrates an example of an embodiment of the state flow in a scenario where the gestureobject for the highest layered touchobject has a valid condition.
FIG. 5 is a continuation of FIG. 3 and illustrates the same example as FIG. 4 but where the gestureobject at the highest layered touchobject does not reach valid condition.

Described herein are systems and methods for enabling a multi-touch gesture recognition engine, where gesture recognition can be made based on touch or motion detection. In accordance with an embodiment, the system includes a hardware input list delivered from the hardware sensor(s), a touchobject list delivered from the application(s)/operating system (OS), and logic to calculate and determine gestures based on mapping touchpoints from the sensor(s) with touchobjects from the application(s) in a time perspective. The engine can use a generic state machine in each gestureobject to keep track of the status of the gestureobject independently. The forward flow of possible states can be common across all gestureobjects implementations. However, the criteria for when a condition allow moving forward in the state machine, can be left to the individual logic implemented in each gesture class. The logic can make state change decisions, based on a combination of historic touchpoints, movement, speed and acceleration e.g. together or relative to each other. Additional sub state machines inside each gesture class implementation can provide advantages for the individual logic of the gesture. The engine can send events to the application based on the state machines. The generic state machine can send start/stop/cancel events in a given order, where the first event could be start and the last could be either stop or cancel. A cancel event could be raised if the gesture never reached valid state before being disposed. The generic state machine can send valid events, when a gesture has reached a valid condition; for example, the internal logic of this gesture has reached a ready to activate condition and can reach a valid condition, if no other gesture at a higher z-index or higher priority is using the same touchpoint(s) as this gesture. In this example the internal gesture specific state machines can control how often tentative/valid events are raised. The engine can collect the touchpoints from the hardware sensor(s) with the same speed that the sensor delivers the inputs. The engine can then store the inputs until the application(s)/OS sends a softwaretick to handle feedback from the engine. The applications software cycle (started by the softwaretick) can be independent of the hardware cycle(s), with which the hardware sensor(s) sends its touchpoints to the engine. When a software cycle starts, the logic can update all touchobjects including gesture subscriptions. The system can ask the application(s) for each new touchpoint(s), if it is within the touchobject(s) perimeter. Alternatively, the application(s)/OS can provide a method for the system to calculate position and area as part of creating the touchobject(s). In the scenario where a touchpoint(s) is within a touchobject(s) area, a gestureobject(s) for the touchobject(s) can be created with this touchpoint(s). In the case a gestureobject(s) already exists, the new touchpoint(s) can be included into the gestureobject(s). In case the touchpoint(s) already exists, the logic can update the gestureobjects with the new position of the known touchpoint(s). The logic can group touchpoints based on e.g. proximity and time between the touchpoints(s). It can allow touchpoints to move through touchobjects based on their transparency and layer. The engine can create as many gestureobjects as the touchobject(s) subscribes to and dispose them over time, as each gestureobjects becomes invalid. The system allows the application(s) to render feedback faster, and informs the application(s) if a previously rendered feedback could be cancelled. By combining the generic state machine with the overall logic of the engine, new gesture classes can be implemented and added independently of each other. At the same time, the system is able to deliver accurate tentative events for all possible gestures instantly—and eventually report cancel events for all gestures, except the one (if any) that became valid. The system is able to simultaneously handle multiple z-indexed objects involving virtually unlimited complexity of touchpoints, movement, and timing conditions. While the examples generally rely on a periodic softwaretick, embodiments can also be implemented entirely event driven off the touchpoints delivered by the hardware sensor(s). The embodiment can rely on the same logic as the examples, basing it on the model for a generic state machine implementation of all gesture classes, an overall engine handling priority between gestureobjects through their progress in the state machine, taking z-index, priority and touchpoint grouping into account, and with that deliver correct tentative and valid events for the recognized gestures.

Glossary of Terms

In accordance with an embodiment, the following terms are used herein:

A "touchobject" is an application(s) defined object(s) that, based on touch or motion gestures, e.g., can be moved, resized and closed/opened. The touchobject can subscribe to one or many gestures. In accordance with an embodiment the touchobject is controlled by the application layer, and the engine calculates feedback based on the definition of the touchobject. It is then left to the application to render any feedback provided by the engine.

A "touchpoint" is a unique position defined by either one or more coordinates that either is within or outside of the perimeter of a defined object(s), which is implicit or explicit rendered on one or many screens. In accordance with an embodiment, the touchpoint is collected by the hardware sensor(s) with associated software and delivered to the engine as an input.

A "gesture recognition engine" is a software system that includes logic to calculate inputs and deliver output to an application(s)/OS. For example calculations based on touchpoints received from the touch system can be mapped with touchobjects received from the application/OS. Those calculations are then transforming inputs into gestures, that are delivered as output to the application(s) in form of events. In accordance with an embodiment, the gesture recognition engine is a set of lists and algorithms to determine, what gesture the user did, and provides the application(s) with feedback based on the outcome of the determination.

A "gestureobject" is a software object created by the engine based on a gesture class that contains the logic required to recognize one isolated gesture without taking other possible gestures into account. In accordance with an embodiment, the gestureobject is created based on logic where touchpoints and touchobjects are mapped. A gestureobject is created for each gesture type subscribed by a touchobject, when new touchpoints are detected within the perimeter of the touchobject.

A "softwaretick" is a periodic call from a higher level scheduling system, e.g., an application, to a lower level system, e.g., the engine. Each call follows a sequence (software cycle) of input from the higher level, logic based on input at the lower level, and a return call with output from the lower level to the higher level system. Only one softwaretick can run at the time, and the period with which it is called is depending on the higher level system. A periodic softwaretick is used in the examples to start the system logic. However an embodiment can be implemented entirely event driven from the touchpoints delivered by the hardware sensor(s), and therefore without the softwaretick.

Introduction

Existing touch gesture recognition engines are simple and focus on delivering immediate rendering of the feedback based on the user input, where immediate means within e.g. 100 ms. A user's input can be defined as a touchpoint with a specific position. The touch system then generates an id and a coordinate (x, y, z) for each touchpoint. This is then delivered to the gesture recognition engine, either directly or through the computer's operating system.

The existing model is simple because it looks at few touchpoints, where, e.g., one touchpoint can move, click or hold an object, while two touchpoints can resize the object. With few touchpoints, it means that the system can easily determine if the touchpoint is within the perimeter of an object or not, because it is simple to calculate if one set of (x, y, z) is within the perimeter of a touchobject. At the same time, few touchpoints means few gestures, which then results in simple calculations to determine, what gesture the user made and thereby render feedback within milliseconds.

However, the simple model has its limitations, because it depends on the speed with which the user provides the inputs. When a user touch with, e.g., more than one finger, it is rare that all fingers touches at the precise same time. For example, if a user touches with two fingers, the time from the first finger touch until the second finger touches can be as long as, e.g., 100 ms. However if the user touches with, e.g., five fingers, it can take up to several hundred milliseconds from the first finger touch until all five fingers touches.

In the current model there are two options: one is to postpone all calculations, until the system can determine how many fingers are touching. Using this option it can take, e.g., 500 ms before the system can render a complex gestures like a five finger move. This is a long enough time for the user to experience a delay from input to rendered output and therefore, the system will be interpreted as slow. The alternative option is to render feedback based on the touchpoints received at any given point in time. For example, if a user has moved with one finger for 50 ms, and after 100 ms the user has added one more finger, and after 500 ms all five fingers are moving. For illustration purposes in this example the system recognizes max-four-finger-move and five-finger-move gestures. If the system uses a method for rendering feedback fast, it means the system will render max-four-finger-move immediately and continue the max-four-finger-move for 500 ms. After the 500 ms the system stops the max-four-finger-move gesture and instead renders the five-finger-move. In this case the user experience will be different than expected, because the user intended a five-finger-move, but the system first rendered the wrongly detected max-four-finger-move, before it renders the correct five-finger-move.

This means that when using today's systems, there is a tradeoff between either rendering the feedback fast without knowing if it is accurate and therefore with the risk of rendering unintended feedback—or wait until there is certainty with the risk of being slow. The other problem with the current model is that all touchpoints have to be within the touchobjects perimeter. For example, if the user touches a window with five fingers, all five fingers have to touch the window. If one finger touches outside of the window, the system will disregard the finger and calculate the feedback based on the four fingers. In a situation where a four-finger-touch means a different gesture than a five-finger-touch, the system will render unintended feedback, because it's based on a four finger gesture. In this example the user will experience a different feedback than expected.

Lastly, as touch systems are able to detect more touchpoints, the number of touch gestures can expand. This means the model will need to have a method for detecting and handling more gestures without having to choose between a slow or inaccurate rendering of the feedback. It is important to realize, that the delay with which a human hand can provide input with more than one finger, is not something that a computer system can resolve by adding more power, processor or speed. The solution needs to be found in how the computer system captures the inputs and calculate outputs over time, in order to render the correct feedback fast. These are the general areas the embodiments of the invention are intended to address.

Described herein are systems and methods for enabling a multi-touch gesture recognition engine, where gesture recognition can be made based on touch or motion detection. In accordance with an embodiment, the system includes a computing device with a surface that reacts to touch or a motion, and a gesture recognition engine (engine). The engine includes, or can be associated with, a touch or a motion input from hardware sensor(s), application(s) input in terms of software tick (softwaretick) and touchobject information, a touchobject list, a hardware input list, a logic handler, and events as output to the application(s). The system collects touch or motion inputs from the hardware sensor(s) either directly from the sensor or through the OS and stores the input in the hardware input list. The system also collects information from the application(s) for each touchobject and stores the input in a touchobject list, either directly from the application or through the OS. This means the engine receives touchobject inputs, when the application(s) creates a new touchobject, updates an already known touchobject (e.g. resize) and/or a touchobject is disposed. The system can receive a request from the application(s) in the form of a softwaretick either directly from the application(s) or through the OS. The engine runs its logic based on its current hardware input list and touchobject list. The output is returned as events to the application(s). The application(s) then uses the event(s) as input to its own logic, before the application renders the feedback. The softwaretick can either be pushed to the engine, or the engine can pull the application or OS for a softwaretick. The system can start its logic based on either a hardware triggered event or a softwaretick.

In accordance with an embodiment, the hardware input list includes all touchpoints delivered from the hardware sensor(s). This allows the system to calculate the velocity vector, the acceleration and path traveled over time for each touchpoint. By combining the velocity vector, acceleration and path traveled, the system can determine more accurately, if a touchpoint is moving. For example, if the velocity vector is low, the path is short but the acceleration is high, so the touchpoint is most likely moving.

In accordance with an embodiment, a touchobject list means the system has a list of all touchobjects the application(s) has defined. When the application(s) creates a new touchobject, updates an existing touchobject or disposes a touchobject, the touchobject list is updated. Each touchobject can have the following attributes: transparent or solid, the z-index, the perimeter of the touchobject, and what gesture types it subscribes to. This allows the system to handle irregular shapes such as, e.g., circular touchobjects.

The system includes a list of gesture types, also called a gesture library, where each gesture type has its own class. A gesture type can, e.g., be one-touch-point-click, two-touch-point-move, or five-touch-point-hold.

In accordance with an embodiment, the system logic means that the engine loops through all the touchpoints from the hardware input list. For each new touchpoint, the engine can ask the application(s)/OS if the touchpoint is within a touchobject area, or use a previously assigned formula to determine the perimeter without involving the application(s)/OS, starting from the top z-index, going down. If that is true, the system is able to create a gesture object (gestureobject) for each gesture-type this touchobject subscribes to. If it is an existing touchpoint with a new position, the gestureobject is updated with the new position of the touchpoint. Each gestureobject is defined by a gesture-type and can have the following attributes: state, timer, position offset, resize offset, and list of touchpoints. Additional attributes for specific gesture classes can be added as needed.

In accordance with an embodiment of the gestureobjects, each gestureobject runs through a state machine. All gestureobjects run through a generic state machine and some gestureobjects can run through additional internal state machines. Which internal state machine that applies depends on the gesture class of the gestureobject. A generic state machine allows gesture classes to have some shared logic implementation and with that, the engine can rely on each gestureobject to follow the same flow. This gives the engine an option to manage prioritization between gestureobjects that can become valid at the same time, as well as allow higher-prioritized gestureobjects that take longer to validate, to use the time needed without any lower priority gestureobjects become valid ahead of time. The generic state machines first state is building, followed by tentative, ready to activate, valid, and finally dispose. The system can map the touchobject subscriptions with the touchpoints received from the hardware input list and create applicable gestureobjects based on this. For example, a touchobject subscribes to five-finger-click and two-finger-move, when the system detects a touchpoint that is within the touchobjects perimeter, the system will start building two gestureobjects—one for the two-finger-move and one for the five-finger-click. Both gestureobjects have building state. Once finger number two touches the surface, the gestureobject for two-finger-move will reach tentative state and send an event to the app, that a tentative state has been reached. At the same time, the systems gestureobject for five-finger-click will stay in building state. Once touchpoint number three is registered, the gesture for two-finger-move is no longer tentative, and a cancel event for the gesture is sent to the application(s). Then, the system disposes the gestureobject for two-finger-move. At the same time, the system added a third finger to the five-finger-click that is still in building state. Once the system has detected all five fingers, the gestureobject's state moves to tentative and sends the first event to the application for this gestureobject. The system then detects that all five fingers went up (i.e., were removed from the surface), and a five-finger-click valid event is sent to the application. Once a valid state has been reached, it is left to the implementation of the gesture class how to handle if fingers are added or removed from the gestureobject. When the gestureobject is valid the application(s) knows what the gesture is and can render the feedback accordingly. Once all fingers are up, the state moves to dispose, and the gestureobject is disposed. Another component of the gestureobject is a timer that allows the gestureobject to be built over a defined timeframe. Once the timeout has occurred for a gestureobject in building state, it will be disposed. By sending the tentative events the system gives the application(s) the option to render feedback, before there is a 100% certainty of what gesture the user is attempting. This means the systems logic can lower the risk of unintended rendering, without compromising the request of delivering fast output. The fast feedback can also be obtained by the frequency with which the system delivers state events to the application(s). This way the system can support the application(s) in rendering feedback fast, mapping the touchpoints with the touchobjects, and listing all possible gestureobjects based on the touchobjects subscriptions. The model is able to reduce gestureobjects based on, e.g., touchpoints received and time, where tentative events can be sent based on simple calculations. This way the model can compensate for the natural delay humans will have when performing gestures with more than one finger, or gestures that take time to fully validate.

In accordance with an embodiment, the system rules for grouping touchpoints can mean that all touchpoints do not have to be within the touchobjects area. The engine can group touchpoints that are close together based on a set of rules, where the assumed distance between, e.g., a user's fingers on a hand, and the assumed maximum time between, e.g., a user's fingers touching an object (if the intent was to touch at the same time), is taken into account. This means that if a touchpoint is outside of the touch area but within a defined accepted distance and time, it can be included in the gestureobject for that specific touchobject. The grouping of touchpoints also means that gestureobjects can be disposed and events cancelled, based on touchpoints added to the group. The distance between the touchpoints can be measured in physical distance in order to create more transferable result, but it could also be measured in pixels. Because the human hand is designed with five fingers, where one finger (the thumb) is further away than the other four fingers, the different distances between the fingers (i.e., touchpoints) can be taken into account when grouping the touchpoints. For example, a five-finger-click can be valid in a situation where four fingers touch within the touchobjects area and one finger (the thumb) touch outside the touchobject, and allowing a larger distance between the thumb and the next finger than the distance between the other four fingers. By adding grouping and distance between touchpoints to the model, the system can handle touchpoints outside of the touchobject and render more accurate feedback to the user.

In accordance with an embodiment, touchobjects are introduced, where the application can define each touchobject including subscriptions to one or more gesture types. The touchobject also operates in layers and with transparency, which means, e.g., a window, can contain, e.g., three touchobjects: one for the windows position & size, one for the content position & scroll and one for the button closing the window.

In this example, the button will be the top layer and transparent, the content is the middle layer and transparent, while the window is the bottom layer and solid. This method allows the touch to move through the transparent layers but not move below the solid layer. For this example, one-finger-click on the button will close the window, two-finger-move will move the window, and one-finger-move will scroll the content. In this example, by adding layering and transparency to the touchobjects, the user can move the window with two fingers regardless where the user touches the window (even if one finger touches the button and the other finger touches the content)—and by using the grouping method described above it also means, that in case one of the fingers touches outside the touchobject but is close to the other finger, the model considers it as a group and the two finger move becomes valid.

Using the same example but with two windows overlapping each other, where the lower window is placed in the middle and under the top window. In this example, when a user clicks on the content area on the top window, the click will not create any events. However, had the top window not been solid, the click would have traveled through the window and reached the close button on the lower level and inadvertently closed the lower window. By using a solid layer the system prevents gestures applied to a touchobject that is not absorbing the touchpoint to travel down to lower touchobjects that would have been able to absorb the touchpoint. This way the system is capable of handling many different gestures and combinations of touchobjects simultaneously, and still deliver a fast feedback to the application(s) with full support of cancel events allowing the application to undo unintentional rendering.

FIG. 1 shows an illustration of a high-level view of the system 100 in accordance with an embodiment. As shown in FIG. 1, the system includes a hardware input list 102 that receives touchpoints from the hardware sensor(s) 104. In this example, the hardware sensor delivers every hardware sample directly to the hardware input list. Each hardware sample has a list of touchpoints present in this particular sample. Each touchpoint contains a position and an id, that is stored in the hardware input list. The id is unique for each touchpoint and follows the touchpoint from when it is first registered in the system, until it leaves. The system can use all the hardware inputs from the hardware input list in the calculations; this way the system is able to deliver more accurate outputs. In the illustration, an application 106 creates, updates and disposes touchobjects, and sends those inputs directly to the engine 107. These touchobjects are listed in the engines touchobject list 108, where each touchobject can have the following attributes: transparent or solid, z-index, perimeter and a list of gesture types it subscribe to. One touchobject can subscribe to one or many gestures. In this illustration, the flow starts with the application sending a softwaretick to the engine. The logic 110 then starts to map each touchpoint from the hardware input list with the touchobject list. For each new touchpoint, the logic asks the application if the touchpoint is within a touchobject's perimeter; if the answer is true, a new gestureobject is created and stored in the gestureobject list 112. If the touchpoint is known, the updated position is used in the calculation and the gestureobject(s) is updated accordingly. The logic loops through all touchpoints from the hardware input list. When a condition for an event is present i.e. gestureobject state is tentative, valid or dispose, the logic sends an event to the application. Once the logic has completed its calculations and sent all applicable events, the logic sends a softwaretick-end to the application. This concludes the softwaretick cycle. Throughout the entire softwaretick cycle, the engine continues to collect hardware inputs and store those in the hardware input list. The software cycle can be independent from the hardware sensor cycle, which means that the system is able to update the hardware input list independently from the software cycle. This allows a much faster hardware cycle than software cycle.

FIG. 2 shows an illustration of the gestureobjects state machine. In this example, all gestureobjects runs through the generic state machine 120: building, tentative, ready to activate, valid and dispose. Depending on the conditions of the gesture class, some gestureobjects can run through one or several states within the same hardware sample, or stay in the same state for one hardware sample or more. The gesture class comprises a generic logic component, which is shared with all gesture classes, and a unique logic component which is specific for each gesture class. The unique logic component is the state-change-logic that defines when a gestureobject can move from one state to the next in the generic state machine. When a gestureobject is created, the state machine starts in building state (B). The reason for the building state (B) is to allow a gestureobject with more than one touchpoint, to be built over time or over a set of hardware samples. Once the gestureobject has detected the number of touchpoint needed, the gestureobject state changes from building (B) to tentative (T). When the gestureobject has reached the condition for a valid (V) state (seen from an isolated gestureobject point of view), the gestureobject changes state from tentative (T) to ready to activate (R). When the gesture reaches ready to activate (R) the system analyses, if the gestureobject share touchpoints with other gestureobjects that are at a higher z-index or have a higher priority. If that is true, the gestureobject stays in ready to activate (R) state. If the gestureobject does not share one or more touchpoints with other gestureobjects at higher z-index or higher priority, the gestureobject changes state to valid (V). When the gestureobject is in valid (V) state, it is left to the implementation of the gesture class, how the gestureobject handle adding new or removing existing touchpoints. For example, this means that the gestureobject could continue a valid (V) state, even though a finger is no longer present, as long as there is minimum one finger, from when the gestureobject was build. Finally, when the valid (V) state has been completed, the gestureobject disposes (D). Regardless of what state the gestureobject is in, it can move directly from its current state to dispose (D), if the condition for moving from the current state to the next is not in place. Any gestureobject is built based on the generic state machine; however some gestureobjects can with advantage use sub-state machines in order to determine, e.g., hold, move and resize gestures faster. This means that a generic state machine allows the state-decision-logic of each gesture class to be built without awareness or consideration of other gesture class implementations. At the same time, it allows the overall engine to deliver controlled events to the application(s), based on a gestureobject's current state.

FIG. 3 illustrates two touchobjects where each touchobject has a gestureobject created based on touch inputs. Touchobject B (130) is at a lower z-index and has gestureobject (GO_II). Touchobject A (140) is at a higher z-index and has gestureobject (GO_I), and shares minimum one touchpoint with GO_II. This example illustrates how the generic state machine of each gestureobject is used to give preference to the gestureobject belonging to the top-most touchobject. This is done by preventing a lower z-index gestureobject from reaching valid (V) state as long as a higher z-index touchobject is still in a state where it could/has enter valid (V) state, i.e., the top most gestureobject is in (B), (T), (R) or (V). In this example the focus is on the system level interaction between the two gestureobjects and therefore the touchpoints are not illustrated.

FIG. 4 is a continuation of FIG. 3, and illustrates (150) the two gestureobjects GO_I and GO_II, where GO_I has a higher z-index than GO_II. In hardware sample (sample) 1, both gestureobjects run their own internal logic and end up moving from state (B) to (T). In sample 2, GO_I's logic means it continues to be in (T). At the same time GO_II's logic has reached the condition to move from (T) to (R). At this point GO_II could continue to (V). However the overlaying system is preventing GO_II to move to (V), because the two gesture objects share touchpoints and GO_I is at a higher z-index. In sample 3, GO_I's logic allows the state to reach (R). The overlaying system then detects if any of the touchpoints are involved in high layered touchobjects. When that is not the case, GO_I moves to (V). As soon as a gesture object is allowed to move to a valid state (V), all gestureobjects with lower z-index using one or more of the same touchpoints involved, will be forced to move into disposed state (D). In a situation where the underlying gestureobject has reached a valid state before the overlaying gestureobject is created, then the underlying gestureobject continues its valid condition and the overlaying gestureobject is moved to dispose.

FIG. 5 is a continuation of FIG. 4, and illustrates (160) the same two gestureobjects GO_I and GO_II. In sample 1, both gestureobjects run their own internal logic and move from state (B) to (T). In sample 2, GO_I's stays in (T) and GO_II's moves from (T) to (R). At this point GO_II could continue to (V) but is not permitted for the same reasons as discussed in FIG. 4. However in sample 3, GO_I's logic results in a state change to reach disposed (D). This means that when GO_II's logic is run, there are no longer a gestureobject with shared touchpoints at a higher z-index in a state that potentially can become valid. GO_II is therefore given permission to move from (R) to (V). FIGS. 4 and 5 illustrates how shared touchpoints and layers of touchobjects can permit or prevent a gestureobject to reach valid (V) state, even though its condition from within the gestureobjects logic is valid.

Figures 6, 7:
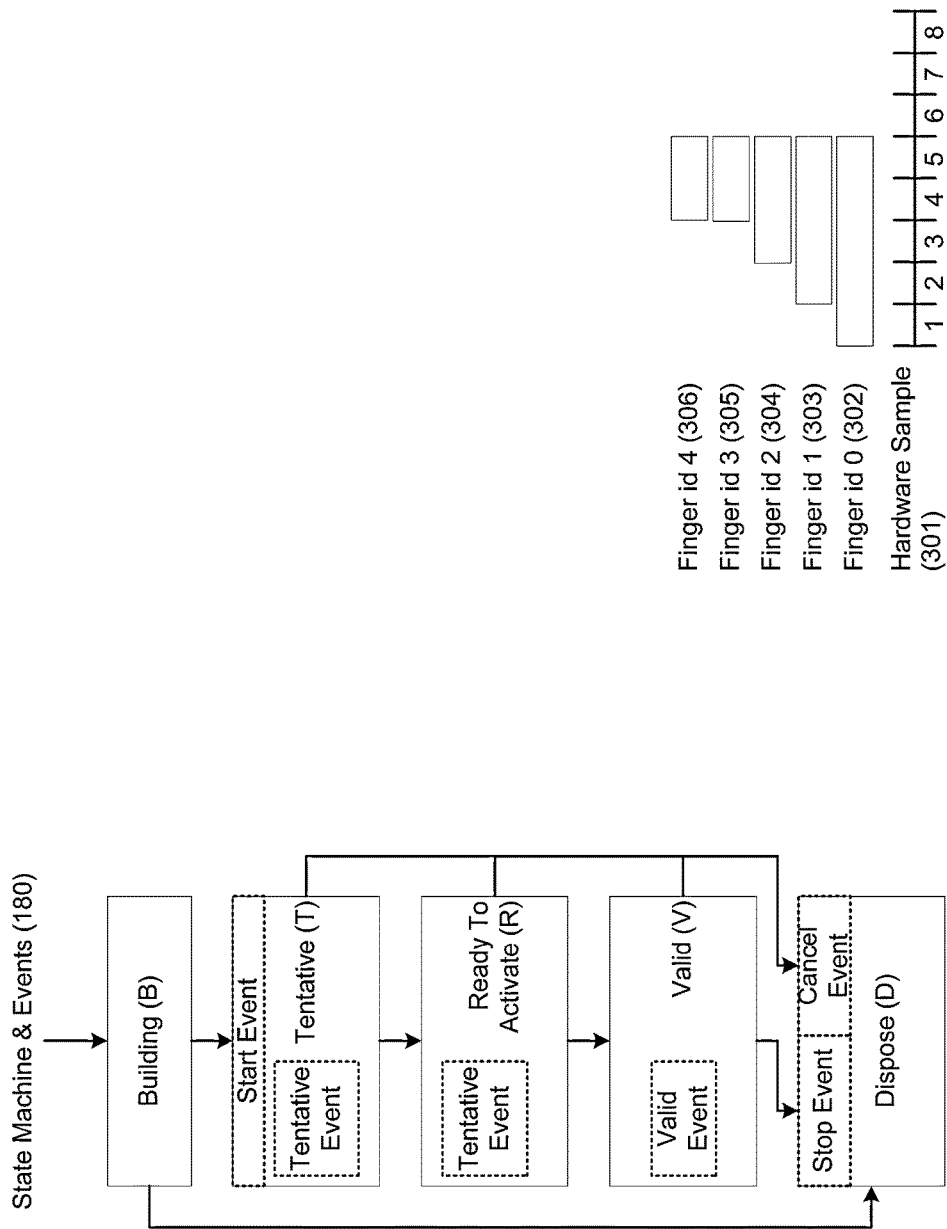
FIG. 6 is a continuation of FIG. 3 and illustrates an embodiment of how the events are tied into the generic state machine.
FIG. 7 illustrates an example of how an embodiment of the engine operates when a touchobject subscribes to more than one gesture.

FIG. 6 illustrates (180) how the engine sends events to the application(s) as a result of the generic state machine. In this example, when a gestureobject enters tentative state (T) a start event is sent for the gestureobject to the application. The system will continue to send tentative events as long as the gestureobject is in tentative (T) and ready to activate (R) state. Once the gesture is in valid state (V) the system can only send valid events. Depending on the implementation of a gesture class, tentative/valid events can either be sent in every hardware sample or only during certain conditions. When the gestureobject enters disposed state (D) from a valid state (V), the engine sends a stop event. If the dispose state is reached from (T) or (R) a cancel event is sent. Once the event has been sent, the gestureobject is disposed. If the disposed state (D) is reached from building state (B), the application does not receive any event for this gestureobject. This way the application(s) can choose when to render feedback based on the events it receives from the engine.

FIG. 7 illustrates how the engine operates when a touchobject subscribes to more than one gesture. In this example, the touchobject subscribe to five-finger-click and two-finger-move, where each touchpoint has a finger id (id) and a position that is shown for each hardware sample (301). For illustration purposes, id0 (302) touches an area in sample 1. In sample 2, id1 (303) is registered as a touchpoint; id2 (304) is registered in sample 3; and in sample 4 both id3 (305) and id4 (306) are registered. In samples 6, 7 and 8 the ids are gone, which means they are no longer registered in the system as inputs.

FIG. 8 is a continuation of the example shown in FIG. 7. The table 320 shows how the state for each gesture changes as the system registers the touchpoints. In the example, the touchobject subscribes to two gestures: two-finger-move and five-finger-click. In sample 1, id0 is registered (marked as X in the table); this means that two gestureobjects are created—one for two-finger-move (GO_M2) and one for five-finger-click (GO_C5). Both gestureobjects start in building state (B). In sample 2, id1 is registered; this means GO_M2 moves from (B) to tentative (T), because the condition for all touchpoints is true. When GO_M2 moves to (T) a start event is sent. At the same time GO_C5 is still in (B), because it needs five touchpoints, before it can move to the next state (T). In sample 3, id2 is registered; this means GO_M2 now has too many touchpoints and moves too disposed (D). When the gestureobject enters (D) from (T), a cancel event is sent to the application. GO_C5 is still in (B) because it only has three out of five needed touchpoints. In sample 4, GO_C5 has all touchpoints and moves from state (B) to (T); at the same time a start event is sent from the engine to the application. In sample 5, all touchpoints are still present and the gestureobject continues to stay in (T). In sample 6, all touchpoints are gone, because all fingers went up/were removed. In this example that is a true condition for the gestureobject to move from (T) through ready to activate (R) to valid (V) and dispose (D) in the same hardware sample. In this case the engine sends first a tentative event, then a valid event followed by a stop event to the application.

FIG. 9 illustrates how grouping of touchpoints can allow a gestureobject to become valid even though not all touchpoints are within the touchobject's perimeter. In this example a touchobject subscribes to a five-finger-move gesture. The user touches the touchobject (401) with three fingers within the touchobjects perimeter, and two fingers outside of the touchobject perimeter. In a situation where the system registers the three touchpoints (402, 403, 404) in sample 1 within the touchobject, a gestureobject will be created with the three touchpoints id0, id1 and id2 (402, 403, 404). In sample 2, the two additional fingers touches, the system groups the new touchpoints id3 and id4 (405, 406) with the existing touchpoints id0, id1 and id2 (402, 403, 404). The condition for the new touchpoints to join the group is a combination of time and distance between the individual touchpoints.

FIG. 10 is a continuation of FIG. 9, where the five touchpoints are registered in a different order and within the accepted timeframe. In this example, two touchpoints id0 (410) and id1 (411) are registered simultaneously but only id1 (411) is within the touchobject (401) perimeter. Id0 (410) is outside of the touchobject (401) and far away from id1 (411). In this case the gestureobject for touchobject (401) will include one touchpoint id1 (411), because the id0 (410) is too far away and outside of the touchobject (401) perimeter. In sample 2, two additional touchpoints id2 and id3 (412, 413) are registered, in this case both of them are within the touchobject area (401). When this happens the system adds id2 and id3 (412, 413) to the existing gestureobject, but id0 (410) is still too far away to be grouped into the gestureobject. In sample 3, touchpoint id4 (414) is registered outside of the touchobject perimeter (401), but because it's close to touchpoints id3 (412) it's added to the group of id1 (411), id2 (412) and id3 (413). At the same time id4 (414) is within accepted distance of id0 (410) and therefore id0 (410) is added to the group. This means the gestureobject now consists of five touchpoints id0 to id4 (410 to 414). In this implementation the logic detects if a second touchpoint is within the accepted distance and timeframe of a first touchpoint. If that condition is true, the system will create a group where the first touchpoint joins the second touchpoint. Then the system will create another group where the second touchpoint joins the first touchpoint, unless the first touchpoint already is in a group. In that case the second touchpoint will join the group of the first touchpoint—and all touchpoints from the first group will join the second touchpoint group.

Figure 11:
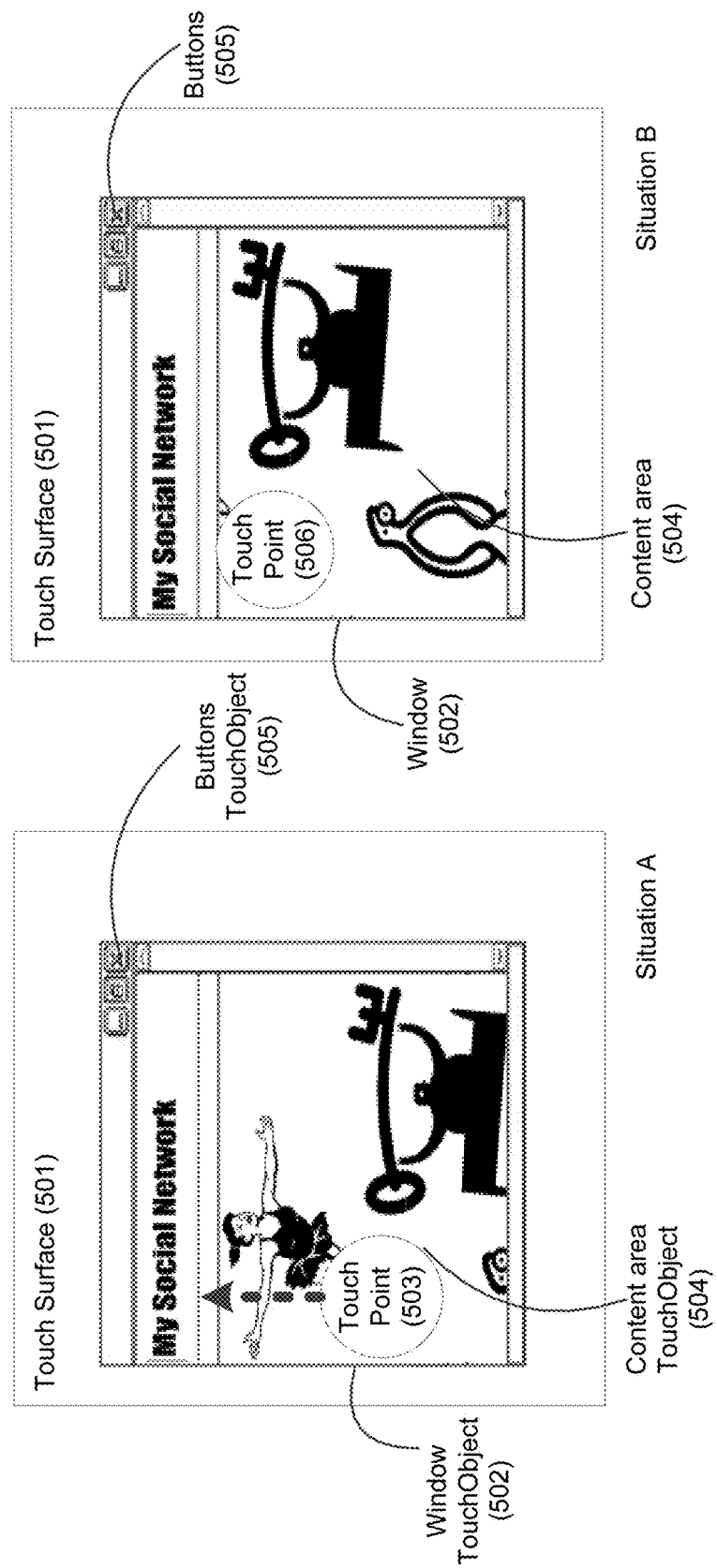
FIG. 11 illustrates how an embodiment of touchpoints can move through transparent layers and by this have more than one touchobjects in the same area.

FIG. 11 illustrates how touchpoints can move through transparent z-index, and by this have more than one touchobject in the same area subscribing to different gestureobjects. In this example, the touch surface (501) is an area the user can touch, e.g., a desktop on a computer with a window open. In this scenario, the window (502) is a touchobject. Inside the window there is a separate touchobject for the content area (504), which is transparent, and an additional touchobject at the top with buttons (505) that is also transparent. By introducing transparent layers it means the touchpoint can move through the touchobject at the highest z-index, to another touchobject that is at a lower z-index. In this example the different touchobjects subscribe to different gestures, e.g., one-finger-move to scroll the content (504), one-finger-click to click the buttons (505), and two-finger-move to move the window (502). This means that in case touchpoint (503) moves (illustrated as a thick dotted line in situation A) to a new position (506), the valid gesture will be one-finger-move, and only the content will scroll without repositioning the window (502)—as shown in situation B. In this example the one-finger-move could be detected as, e.g., a user's finger touching the surface and moving the finger in the direction of the arrow; or it could be the user moving the finger in front of the surface, which then is motion detection instead of physical touch detection.

Figure 12:
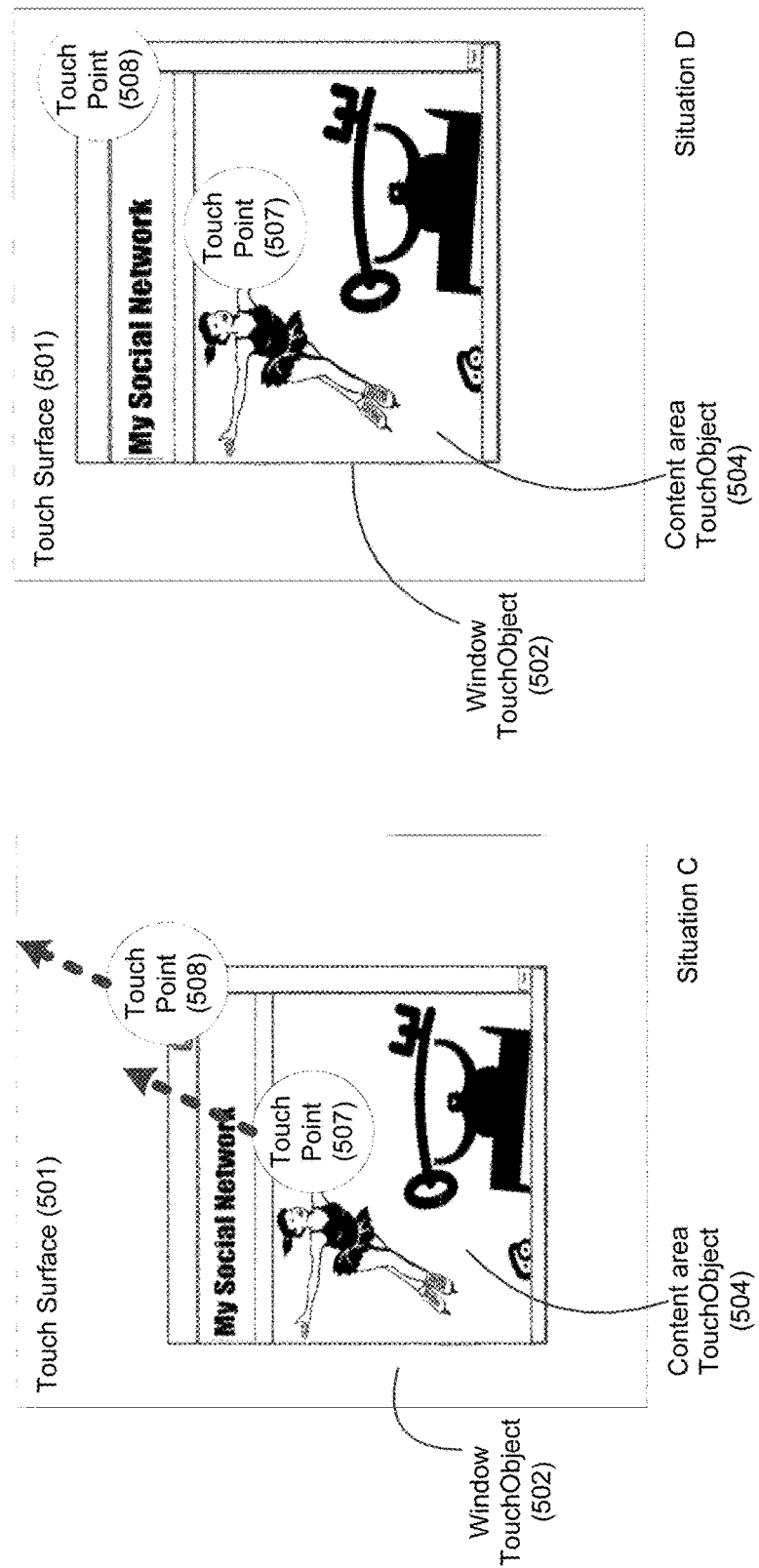
FIG. 12 is a continuation of FIG. 11 and illustrates an embodiment with layered transparent touchobjects, where touchpoints made on a higher z-index touchobject are transferred to lower solid z-index and included in the gesture recognition logic of all touchobjects the touchpoint passes.

FIG. 12 is a continuation of FIG. 11. In this scenario (situation C) one touchpoint (507) touches the content area (504), and another touchpoint (508) touches the button (505). The user then moves their fingers towards the upper right corner (illustrated as thick dotted arrows in situation C) of the touch surface (501). In this case the system will build one gestureobject for one-finger-move, and another for two-finger-move. However, as soon as touchpoint (508) touches the surface, the gestureobject for one-finger-move will be cancelled and the two-finger-move becomes valid. This means the window (502) will move to the new position, without scrolling the content (504), as shown in situation D. This is possible because of the transparent z-index, where the button (505) is the top z-index, the content area (504) is the middle z-index and the window (502) is the bottom z-index. If the finger for touchpoint (507) moves a little before touchpoint (508) appears, the content z-index (504) will receive tentative events and the application can decide to render the movement. As soon as touchpoint (508) appears, the engine will deliver a cancel event, and the application can choose to move the content position back to its original position, before it moves the window to the new position (shown as situation D). In this example when touchpoint (507) touches, it will move through the transparent touchobject (504) to the solid touchobject (502). The system will create gesture objects based on mapping touchpoints (507) with touchobjects (504) and (502), as well as the gestures they subscribe to. When touchpoint (508) position is within the transparent touchobject (505) perimeter, the touchpoint (508) runs through all the transparent z-index until it reaches the solid touchobject (502). The system then maps touchpoint (508) with the touched touchobjects (505, 504 and 502). Based on the logic, new gestureobjects are created and existing gestureobject are updated or disposed depending on the conditions of each gesture class. Similar to FIG. 11, the example is described using touch but could just as easily have been described using motion detection.

Figure 13:
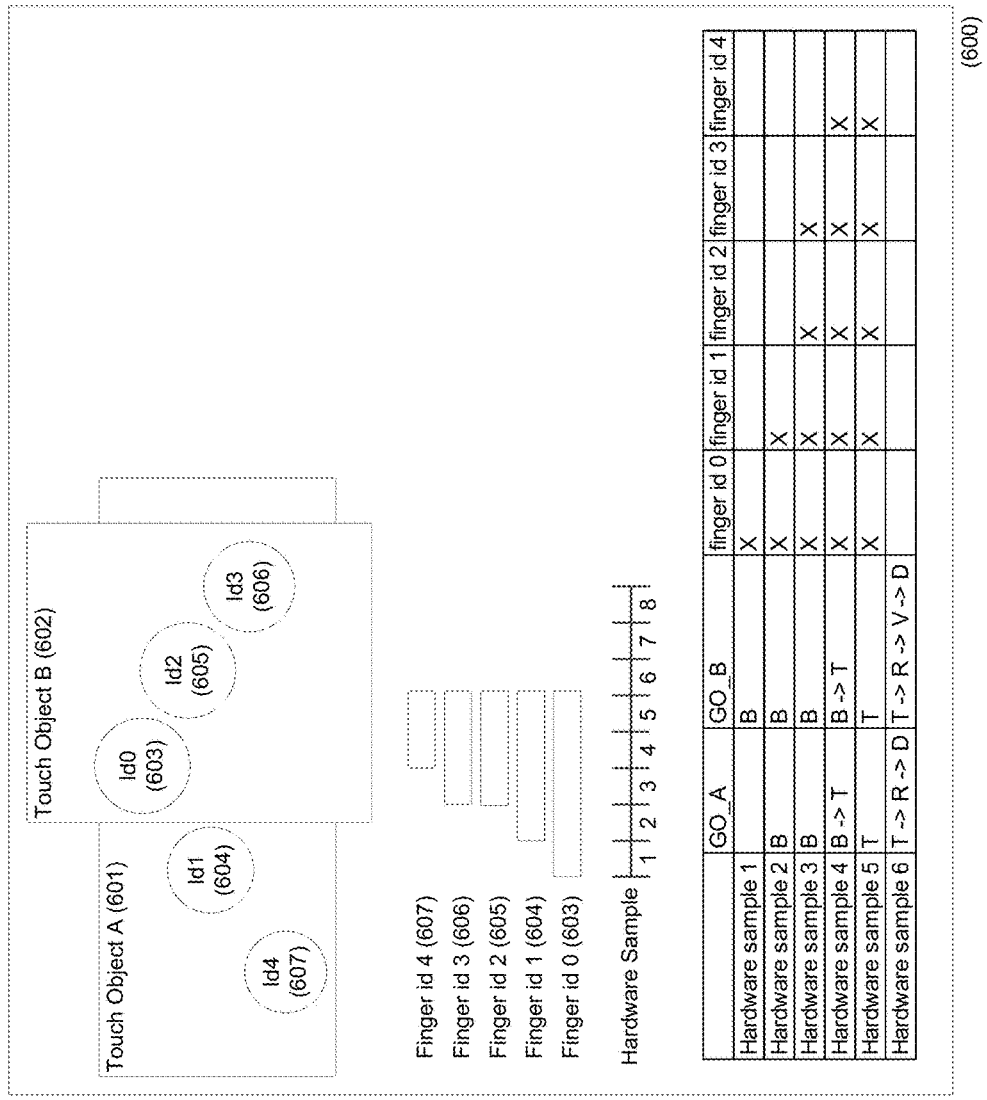
FIG. 13 takes the illustration from FIG. 3 and demonstrates an embodiment where combining grouping of touchpoints with the z-indexed solid touchobjects can prevent lower z-indexed gestureobjects from reaching valid state.

FIG. 13 takes the example from FIG. 4 and illustrates (600) a more advanced example of layered touchobjects and grouping of touchpoints to build gestureobjects over a set of hardware samples. In this example, touchobject A (601) is solid and subscribes to five-finger-click (GO_A); touchobject B (602) is also solid but at a higher layer and also subscribes to five-finger-click (GO_B). In hardware sample (sample) 1, id0 (603) is registered within object B (602) perimeter, which means GO_B is created with id0 (603) in building state (B). However, because touchobject B (602) is solid, this means id0 (603) does not move through to touchobject A (601). In sample 2, id1 (604) is registered within object A's perimeter and GO_A is created with state (B). Because id0 (603) and id1 (604) are within close distance, the touchpoints are grouped. This means id0 (603) joins id1 (604) for GO_A and id1 (604) joins id0 (603) for GO_B. In sample 3, id2 (605) and id3 (606) is registered within object B area and they are included in GO_B that stays in building (B) state. Because id2 (605) is close to the group of touchpoints for GO_A, id2 (605) and id3 (606) are included in GO_A. In sample 4, id4 (607) is registered within object A (601) area. In this case GO_A have all touchpoints needed and move to tentative (T) state. However, id4 (607) is also grouped into GO_B because it is within the accepted distance and time of id1 (604). This means both gestureobjects have (T) state. In sample 5, there is no change in touchpoints and therefore no updates to GO_A and GO_B, and both stay in (T). In sample 6, all touchpoints are gone, e.g. the fingers went up/were removed. In this example that is the valid condition for the gesture. Therefore GO_B moves from tentative (T), to ready to activate (R) and because there is no object at a higher level, GO_B becomes valid and disposes. For touchobject A (601) GO_A also moves from tentative (T), to ready to activate (R) and, because touchobject B (602) is above object A (601) and includes a valid GO_B, GO_A moves to dispose (D) without ever becoming valid (V).

Figure 14:
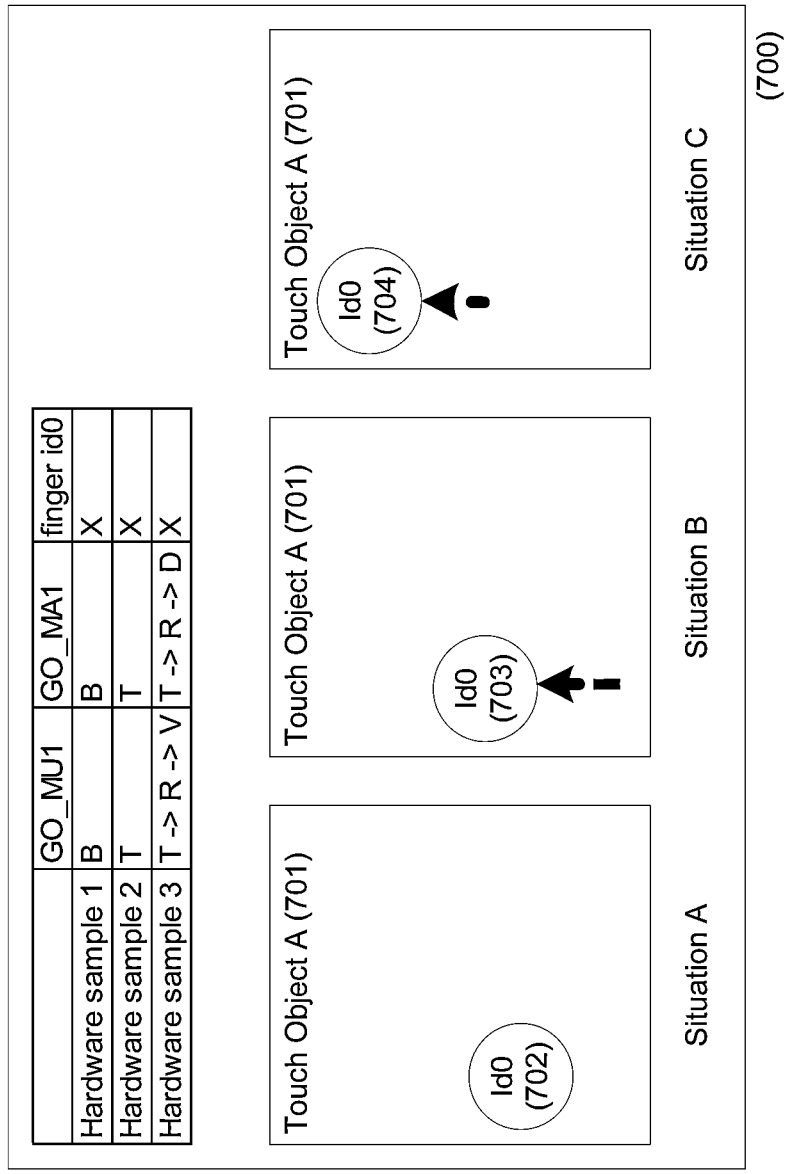
FIG. 14 illustrates an embodiment where multiple gestureobjects for the same touchobject reach a valid condition with shared touchpoints, and gesture class priority is used to select which gestureobject is allowed to enter valid state.

FIG. 14 illustrates (700) handling of priorities between gestureobjects for the same touchobject in a situation where the gestureobjects have a valid condition and shared touchpoint(s). In this example, touchobject A (701) subscribes to one-finger-move-up (GO_MU1) and one-finger-move-any (GO_MA1). GO_MU1 has a valid condition, when the touchpoint has moved a defined distance over a given time in a vertical line, as defined by its gesture class. GO_MA1 has a valid condition, when the touchpoint has moved a defined distance over a given time in any direction, as defined by its gesture class. In hardware sample (sample) 1, touchpoint id0 (702) is registered. This means GO_MU1 and GO_MA1 is created with id0 and in building (B) state. In sample 2, id0 (703) has moved a little (illustrated as a thick dotted line in situation B), which means GO_MU1 and GO_MA1 moves to tentative (T) state and sends a start event for each gestureobject. In sample 3, id0 (704) has moved so far that both gestureobjects have a valid condition and reach ready to activate (R) state (illustrated as situation C). However the engine does not allow two gestureobjects with the same touchpoint to be in valid state at the same time. This means that the system determines based on the gestureobjects priorities (defined in their gesture class), which gestureobject is allowed to enter valid state. In this example GO_MU1 has a higher priority than GO_MA1 and therefore, GO_MU1 moves from (R) to valid (V) state, while GO_MA1 is disposed (D). Similarly, if GO_MA1 reaches (R) before GO_MU1 is disposed, or as long as GO_MU1 is in either (B) or (T), GO_MA1 will be held in (R).

Figure 15:
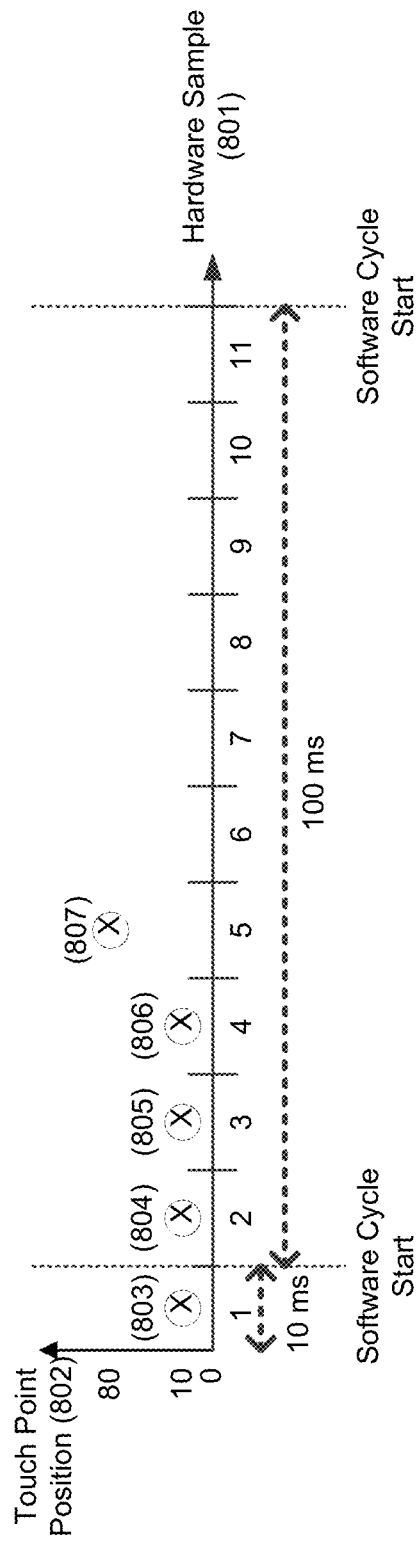
FIG. 15 illustrates an embodiment of the system that make more accurate calculations by using all touchpoints from the hardware samples collected over time.

FIG. 15 illustrates how the system can provide a more accurate output when using all touchpoints from the hardware sensor instead of only using the latest touchpoints from the hardware. In this example, the touchpoint is used for calculating speed, acceleration and distance moved. The illustration shows the position (802) of touchpoint X (803-807) for every hardware sample (801) and how this influences the calculations of speed and acceleration. Sample 1 is outside of the first software cycle and touchpoint X (803) has position 10 on the position scale (802). When the first software cycle starts, there is only one sample of the touchpoint meaning distance, speed and acceleration will be zero. For the next 3 samples, touchpoint X (804, 805, 806) stays at position 10 (802). However in sample 5 (801), X (807) has moved to position 80 (802). In this example the software samples start after 100 ms, and a new hardware sample starts every 10 ms. In case the system only looked at the touchpoint based on the software cycle, the result would be a distance $$\Delta d=(80-10)=70$$

and the time would be $$\Delta t=100 \text{ ms}$$

so that the speed v=70/100=0.7 and the acceleration a=0.7/100=0.007. If the calculation is based on every hardware sample then $$\Delta d=(80-10)=70$$

$$t=10 \text{ ms}$$

$$v=70/10=7$$

$$a=7/10=0.7$$

This example demonstrates how the same samples can result in radically different results if based on either the hardware (v=7 and a=0.7) or the software (v=0.7 and a=0.007) cycles. It also illustrates how using all hardware inputs makes the calculations more accurate. Having accurate results allow the implementation of gestures to be better tuned to respond to user input. In an example where a swipe gesture could be accepted as valid if the acceleration was higher than 0.2, the hardware sample method would recognize the gesture properly, but the software cycle method would fail.

Figure 16:
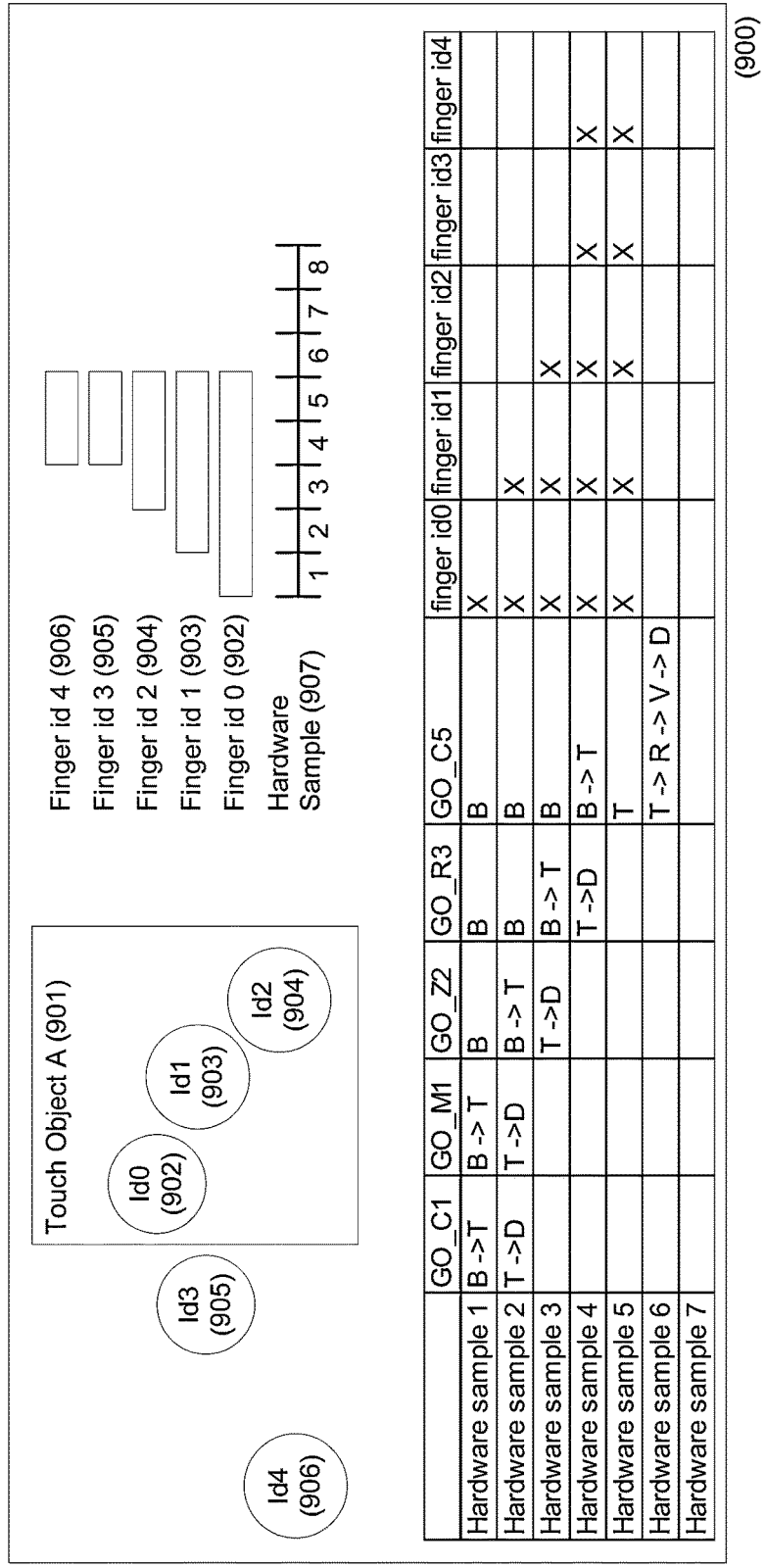
FIG. 16 illustrates an example of an embodiment where the engine is able to reduce gestureobjects down to one single gesture by using the methods and systems described herein.

FIG. 16 illustrates an example (900) of how the engine is able to reduce gestureobjects by using the methods and systems in accordance with an embodiment. In this example, touchobject A subscribes to five different gestures: one-finger-click (GO_C1), one-finger-move (GO_M1), two-finger-zoom (GO_Z2), three-finger-resize (GO_R3) and five-finger-click (GO_C5). For illustration purposes, GO_Z2 means that the two fingers move in opposite direction, and GO_R3 means two fingers hold and then the third finger move either towards the two fingers or away from the two fingers. The example shows how the touchpoints touches in hardware samples, and the table illustrates how the state of each gestureobject changes over time, as the hardware samples (sample) (907) report more touchpoints. In sample 1, finger id0 (902) touches touchobject A (901). Because A (901) subscribes to five different gestures, the system creates five gestureobjects, one for each possible gesture type. GO_C1 and GO_M1 both move through building (B) to tentative state (T) and send a start event to the application. GO_Z2, GO_R3 and GO_C5 will remain in building (B) state. In sample 2, id1 (903) touches the object, this means GO_C1 and GO_M1 both move from tentative (T) state to dispose (D) and send a cancel event to the application. GO_Z2 now moves to (T) and send a start event, because it has the touchpoints needed to become valid. However GO_R3 and GO_C5 remain in (B). In sample 3, id2 (904) touches object A; this means GO_R3 now moves to (T) because it has all three touchpoints required for the gesture. GO_Z2 moves to dispose (D), because it has too many touchpoints and sends a cancel event to the application. In sample 4, id3 (905) and id4 (906) both touches outside of object A. Id3 (905) is close to id0 (902), which means id3 (905) is grouped with id0 (902). Id4 (906) is close to id3 (905), therefore id4 (906) is also included in the group for object A. This means that there are now five touchpoints (902, 903, 904, 905 and 906) for object A. GO_C5 then becomes tentative (T) and sends a tentative event. GO_R3 will dispose (D) and sends a cancel event. In sample 6, all touchpoints are up and GO_C5 has a valid condition. In this situation GO_C5 will run from tentative (T), through ready to activate (R), valid (V) and to dispose (D); in which case first a valid event and then a stop event will be sent for GO_C5.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for enabling a gesture recognition engine, comprising:

a computer system, including at least a first processor, a first human-interaction touch-input sensor coupled to the computer system, and a visual display coupled to the computer system;

an operating system that executes instructions via the first processor, the operating system comprising a first touch object associated with a first set of gestures, and the first touch object having a first touch object area;

a software application that executes instructions via the first processor, the software application comprising a second touch object associated with a second set of gestures, and the second touch object having a second touch object area;

each touch object being a software object that comprises at least a first logic element required to instantiate a gesture object by mapping a first touch point with the first touch object area, and each touch object subscribes to at least a first gesture;

a gesture library comprising at least each gesture of the first set of gestures and the second set of gestures;

a logic, comprising touch object logic and gesture object logic, that translates a sequence of touch points received from the first human-interaction touch-input sensor into a first gesture event;

the touch object logic receives information that the first human-interaction touch-input sensor has delivered a first touch input associated with the first touch point, and maps the first touch point with the first touch object; and the touch object logic instantiates the first gesture object associated with the first touch point, the first touch object, and a first gesture from the gesture library, where each gesture object is a software object that comprises logic required to recognize a gesture associated with that gesture object;

the system starting a gesture state machine when the first gesture object is created, the first gesture object being associated with a first gesture in the gesture library, a first gesture specific conditions, and a first touch point and a first touch object;

wherein the gesture object logic determines a change of state based on at least one of the following conditions: movement of the first touch point associated with the first gesture object, a first touch point no longer associated with the first gesture object, a new second touch point being associated with the first gesture object, or at least one time condition associated with the first gesture object logic;

preventing a first gesture object to reach a valid state as long as the first touch point is associated with more than one gesture object;

disposing a first gesture object when the first gesture specific logic condition is not met, wherein the first gesture object releases its association with any touch point previously associated with itself;

the first gesture object may create a gesture event when the first gesture object reaches a tentative, ready, valid or dispose state, and the logic may deliver one or more gesture events to the operating system.

2. The system of claim 1, wherein the logic required to recognize the gesture is based on a sequence of touch points and timing events.

3. The system of claim 1, further comprising sending a first gesture event for the first gesture object to the operating system when the condition for the first gesture is met.

4. The system of claim 1, wherein the first touch point comprises a first id, a first position and is associated with a first time.

5. The system of claim 1, wherein an information about the second touch object is collected from an application layer, wherein the application layer defines each touch object including the following information; an area, a layer, and at least one gesture it subscribes to, wherein the system stores the information in a list, and wherein the application layer informs the system about updated positions, change of area, layer, or gesture subscription, and the system updates the list.

6. The system of claim 1, wherein a second touchpoint mapped to the first touch object is offered to an existing first gesture object wherein the first gesture object logic includes the new touch point to the first gesture detection, and wherein the first gesture object logic determines if another gesture object of same type may be instantiated and associated with the second touchpoint and this touch object.

7. The system of claim 1, further comprising sending a second gesture event for the second gesture object to the software application once the condition of the second gesture is met.

8. The system of claim 1, wherein the sequence of touch points is received over time from the first human-interaction touch-input sensor.

9. The system of claim 1, wherein the first touch point is mapped with the first touch object in a time perspective.

\* \* \* \* \*